United States Patent
Iwamoto et al.

(10) Patent No.: US 8,413,426 B2
(45) Date of Patent: Apr. 9, 2013

(54) METHOD OF EXHAUST CLEANING FOR INTERNAL COMBUSTION ENGINE AND EXHAUST CLEANER

(75) Inventors: Jun Iwamoto, Saitama (JP); Go Motohashi, Saitama (JP); Naohiro Sato, Saitama (JP); Hiroshi Ohno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/739,310

(22) PCT Filed: Oct. 22, 2008

(86) PCT No.: PCT/JP2008/069162
§ 371 (c)(1),
(2), (4) Date: Apr. 22, 2010

(87) PCT Pub. No.: WO2009/054421
PCT Pub. Date: Apr. 30, 2009

(65) Prior Publication Data
US 2010/0224142 A1 Sep. 9, 2010

(30) Foreign Application Priority Data

Oct. 23, 2007 (JP) ................. 2007-274583

(51) Int. Cl.
*F01N 3/00* (2006.01)
(52) U.S. Cl. ............... 60/286; 60/274; 60/295; 60/301; 60/303; 48/197 R
(58) Field of Classification Search ............ 60/274, 60/286, 295, 297, 301, 303; 48/197 R
See application file for complete search history.

(56) References Cited

U.S. PATENT DOCUMENTS

| 7,040,084 | B2 * | 5/2006 | Ament ............... 60/274 |
| 7,093,428 | B2 * | 8/2006 | LaBarge et al. ........ 60/286 |
| 7,367,183 | B2 * | 5/2008 | Eberspach ............ 60/286 |
| 7,435,275 | B2 * | 10/2008 | Simpkins et al. ...... 48/197 R |

(Continued)

FOREIGN PATENT DOCUMENTS

| CA | 2 406 386 A1 | 1/2003 |
| EP | 1 057 983 A1 | 12/2000 |

(Continued)

OTHER PUBLICATIONS

Toshiaki Tanaka, et al., "Development of $NO_x$ Storage-Reduction 3-Way Catalyst System", Oct. 1995, pp. 34-38, vol. 26, No. 4.

(Continued)

*Primary Examiner* — Binh Q Tran
(74) *Attorney, Agent, or Firm* — Arent Fox LLP

(57) ABSTRACT

An exhaust cleaning method and exhaust cleaning apparatus for an internal combustion engine (1) in which a fuel is fed and burned under periodical rich/lean combustion conditions. In a fuel reformer (18) disposed independently of an exhaust channel (11) in the engine (1), the fuel for the internal combustion engine (1) is reformed to produce a reformed gas containing carbon monoxide. The reformed gas is supplied to the exhaust to be introduced into an exhaust converter (17) having, disposed therein, a catalyst which adsorbs and reduces nitrogen oxides. The nitrogen oxides contained in the exhaust gas are adsorbed and reduced. Thus, the nitrogen oxides contained in the exhaust are removed at a high efficiency.

16 Claims, 2 Drawing Sheets

U.S. PATENT DOCUMENTS

| | | | |
|---|---|---|---|
| 7,490,463 B2 * | 2/2009 | Silvis | 60/286 |
| 7,861,517 B2 * | 1/2011 | Goulette et al. | 60/286 |
| 8,037,674 B2 * | 10/2011 | Kupe et al. | 60/286 |

FOREIGN PATENT DOCUMENTS

| | | | |
|---|---|---|---|
| EP | 1 421 987 A2 | | 5/2004 |
| EP | 1 739 289 A1 | | 1/2007 |
| JP | 06-042343 | | 2/1994 |
| JP | 08-150322 | A | 6/1996 |
| JP | 2586738 | B2 | 12/1996 |
| JP | 2600492 | B2 | 1/1997 |
| JP | 2002-054427 | A | 2/2002 |
| JP | 2002-54427 | A | 2/2002 |
| JP | 2002-106338 | A | 4/2002 |
| JP | 2003-210944 | A | 7/2003 |
| JP | 2003-322012 | A | 11/2003 |
| JP | 2004-360540 | A | 12/2004 |
| JP | 3642273 | B2 | 2/2005 |
| JP | 2006-512523 | A | 4/2006 |
| JP | 2006-183477 | A | 7/2006 |
| JP | 2007-192055 | A | 8/2007 |
| WO | WO 2005/044426 | A1 | 5/2005 |
| WO | WO 2005/103461 | A1 | 11/2005 |
| WO | WO 2007/008320 | A2 | 1/2007 |

OTHER PUBLICATIONS

Naohiro Satoh, et al., "A $NO_x$ Reduction System Using Ammonia Storage-Selective Catalytic Reduction in Rich and Lean Operations", 15. Aachener Kolloquium Fahrzeug- und Motorentechnik 2006, pp. 259-270.

Jan Kaspar et al., "Automative catalytic converters: current status and some perspectives", Catalysis Today, 2003, pp. 419-449, 77, Elsevier Science B.V.

Decision of Final Refusal issued Jan. 22, 2013 in Japanese Application No. 2007-274583.

* cited by examiner

METHOD OF EXHAUST CLEANING FOR INTERNAL COMBUSTION ENGINE AND EXHAUST CLEANER

CROSS-REFERENCED TO RELATED APPLICATION

This application is a National Stage entry of International Application No. PCT/JP2008/069162, filed Oct. 22, 2008, which claims priority to Japanese Patent Application No. 2007-274583, filed Oct. 23, 2007, the disclosure of the prior application is incorporated in its entirety by reference.

FIELD OF THE INVENTION

The present invention relates to a method of exhaust cleaning for an internal combustion engine and an exhaust cleaner of nitrogen oxides contained in an exhaust gas at a high efficiency.

DESCRIPTION OF RELATED ART

In recent years, nitrogen oxides in an exhaust gas discharged into the atmosphere from an electric generator and an internal combustion engine such as a vehicle are recognized as a problem from a point of view of suppressing toxic emissions. Nitrogen oxides cause acid rain and oxidase smog, and there is a move in the world to regulate an emission amount of the toxic emissions. Since a lean combustion is conducted in the internal combustion engine such as a diesel engine and a lean burn engine of gasoline, oxygen is rich in the exhaust gas of the internal combustion engine. Nitrogen oxides among toxic components existing in the exhaust gas of the internal combustion engine are cleaned through a reduction reaction. However, the reduction reaction is hardly caused in the exhaust gas which has a high partial pressure of oxygen. Therefore, various methods have been studied for solving the problem.

For example, as a method for cleaning nitrogen oxides contained in an exhaust gas from an internal combustion engine under a lean combustion, a method has been known, where nitrogen oxides are absorbed by reacting the nitrogen oxides with, for example, alkali metal or alkali earth metal through active species of an oxidation catalyst under a lean condition where an oxygen concentration is excessive in the exhaust gas, and further, the absorbed nitrogen oxides are periodically reduced and removed under a rich condition where oxygen is insufficient by periodically injecting a fuel (Non-patent literature 1, Patent literature 1 and Patent literature 2). This first method is such a method that after nitrogen oxides are absorbed on a catalyst in an exhaust gas under a lean condition, the nitrogen oxides are reduced by transiently forming a reducing condition under a rich condition where oxygen is insufficient by injecting a fuel.

In addition, another method has been known, where nitrogen oxides are absorbed on a catalyst in a combustion under a lean condition where an oxygen concentration is excessive in an exhaust gas, and subsequently, the absorbed nitrogen oxides absorbed on the catalyst under the lean condition are periodically reduced and removed by periodically synthesizing carbon monoxide and supplying the carbon monoxide into the exhaust gas, as well as periodically forming a condition where oxygen is insufficient in the exhaust gas by controlling the internal combustion engine to be under the rich condition (Non-patent literature 2). In this second method, it was demonstrated that the absorption of the nitrogen oxides on the catalyst under the lean condition takes place at around 200° C. Therefore, a removal of the nitrogen oxides at a lower temperature can be expected in comparison with the first method.

The second method cleans nitrogen oxides in such a manner that in an internal combustion engine under a lean condition, after nitrogen monoxide and nitrogen dioxide existing in an exhaust gas under an oxygen rich environment (lean environment) are absorbed on a catalyst (Formula 1 to Formula 3), carbon monoxide is synthesized and supplied, while transiently controlling the internal combustion engine to be under a rich condition. In this case, the carbon monoxide reacts with water vapor in the exhaust gas on the catalyst to produce hydrogen (Formula 4) under the environment (rich environment) where a partial pressure of oxygen is low, and subsequently, the hydrogen reacts with the nitrogen monoxide in a reducing atmosphere to produce ammonia and the ammonia is adsorbed and held on the catalyst (Formula 5). This final reductant of ammonia reduces the nitrogen oxides adsorbed or to be adsorbed on the catalyst (Formula 6 to Formula 8). It is known that both nitrogen monoxide and nitrogen dioxide can be reduced at a high efficiency by using ammonia under oxygen excessive atmosphere.

  Formula 1 lean environment (large oxygen partial pressure)

  Formula 2 lean environment (large oxygen partial pressure)

  Formula 3 lean environment (large oxygen partial pressure)

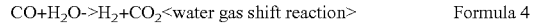  Formula 4 rich environment (small oxygen partial pressure)

  Formula 5 rich environment (small oxygen partial pressure)

  Formula 6 lean environment (large oxygen partial pressure)

  Formula 7 lean environment (large oxygen partial pressure)

  Formula 8 lean environment (large oxygen partial pressure)

In addition, other than the foregoing methods, there is a system which selectively reduces nitrogen oxides in an exhaust gas by using a hydrogen-containing gas which is synthesized within an exhaust flow path of a vehicle. This is an exhaust cleaning system provided with a hydrogen enrichment catalyst which produces a reducing synthetic gas containing more hydrogen than carbon monoxide in volume ratio and a catalyst for cleaning the nitrogen oxides within the exhaust flow path of an internal combustion engine, a combustor and the like (Patent literature 3). This system cleans nitrogen oxides by adding hydrogen, carbon monoxide and hydrocarbons to an oxygen excessive exhaust gas, and a concept of the system is largely different from those of the first and the second methods. For example, in the system, when carbon monoxide is added to the exhaust gas, the shift reaction is not caused under an oxygen excessive condition where a partial pressure of oxygen is high. Therefore, the ammonia synthetic reaction also does not take place.

[Patent literature 1]: Japan Patent No. 2586738
[Patent literature 2]: Japan Patent No. 2600492
[Patent literature 3]: Japan Patent No. 3642273

[Non-Patent Literature 1]:
"Development of NOx Absorption/Reduction Type Ternary Catalyst System", Proceedings of Society of Automotive Engineers of Japan, Vol. 26, No. 4 Oct. 1995

[Non-Patent Literature 2]:
"A NOx Reduction System Using Storage-Selective Catalytic Reduction in Rich and Lean Operations", 15. Aachener Kolloquium Fahrzeug-und Motorentechnik 2006 p. 259-270

DISCLOSURE OF THE INVENTION

Problems to be Solved by the Invention

However, in the first method, the absorption of nitrogen oxides depends on a mechanism which produces a compound through an oxidation reaction by active species of noble metal. Therefore, the nitrogen oxides are absorbed as nitrates and an amount of energy corresponding to the reaction is required. In addition, another amount of energy for reducing the nitrogen oxides which are once absorbed as the nitrates is also required. Furthermore, the absorption reaction and the cleaning reaction are not caused unless a temperature is at around 250° C. In order to increase a cleaning efficiency, a more fuel is required for injection, thereby resulting in poor fuel efficiency and increase in hydrocarbon components in the exhaust gas.

In addition, in the second method, in order to increase a cleaning efficiency, it is required to supply a large amount of carbon monoxide on the catalyst, to thereby promote production of ammonia which is a direct reductant. If an internal combustion engine is controlled to be a rich condition to produce ammonia, an amount of hydrocarbons increases with increase of an amount of carbon monoxide, especially at a starting when the internal combustion engine is not warmed up. Furthermore, a production of carbon monoxide through control of the internal combustion engine has limitations since fuel consumption and calmness are deteriorated due to difficulty of the control.

In addition, when nitrogen oxides are cleaned by hydrogen as with the system described above, since a burning of hydrogen on the catalyst starts at around 200° C., a ratio of reductant to the nitrogen oxides becomes low at a temperature higher than 200° C., thereby resulting in insufficient reduction reaction of the nitrogen oxides. Furthermore, when an exhaust converter which is provided with a hydrogen enrichment catalyst within an exhaust flow path is set up, usage of the hydrogen enrichment catalyst becomes large for sufficient hydrogen production even in a case that an amount of the exhaust gas varies, thereby resulting in growing in size of the converter and increasing in cost.

In addition, in the system, in order to set a condition of $[H_2/CO]d>1$ at a position before an exhaust catalyst converter which removes nitrogen oxides, a burning of carbon monoxide is required, or a means for extracting hydrogen of water vapor in the exhaust gas becomes essential. However, in the exhaust gas of an internal combustion engine where concentrations of oxygen and water vapor vary, it is difficult to stably continue a burning reaction which burns only carbon monoxide and a reforming reaction which extracts hydrogen of water vapor, or the shift reaction. In addition, it is further difficult to control stoichiometric proportions of reductant (hydrogen) and nitrogen oxides to be constant.

It is, therefore, an object of the present invention to provide a method of exhaust cleaning for an internal combustion engine and an exhaust cleaner of nitrogen oxides contained in an exhaust gas at a high efficiency.

SUMMARY OF THE INVENTION

In order to solve the forgoing problems, according to a first aspect of the present invention, there is provided a method of exhaust cleaning for an internal combustion engine which combusts a fuel which is periodically fed under a rich condition and a lean condition. The method includes a step for producing a reformed gas containing carbon monoxide by reforming the fuel of the internal combustion engine by a fuel reformer which is independently disposed from an exhaust flow path of the internal combustion engine, and a step for adsorbing and reducing nitrogen oxides in an exhaust gas by supplying the reformed gas to the exhaust gas introduced into an exhaust converter which is disposed in the exhaust flow path and in which a catalyst for absorbing and reducing the nitrogen oxides is disposed.

In the method of exhaust cleaning for an internal combustion engine, the reformed gas containing carbon monoxide is produced by reforming the fuel of the internal combustion engine by the fuel reformer which is independently disposed from the exhaust flow path of the internal combustion engine. The reformed gas is mixed with the exhaust gas which is introduced into the exhaust converter disposed in the exhaust flow path of the internal combustion engine. Then, the nitrogen oxides are adsorbed and reduced by the catalyst disposed in the exhausted converter, and the exhaust gas can be cleaned, accordingly.

According to a second aspect of the present invention, there is provided the method of exhaust cleaning for an internal combustion engine, where the reformed gas contains more carbon monoxide than hydrogen.

In the method of exhaust cleaning, using the reformed gas containing more carbon monoxide than hydrogen, the adsorption and reduction of the nitrogen oxides by the catalyst in the exhaust gas introduced into the exhaust converter can be promoted.

According to a third aspect of the present invention, there is provided the method of exhaust cleaning for an internal combustion engine, where a temperature of the reformed gas introduced into the exhaust flow path is set to be higher than a temperature of the exhaust gas in the exhaust flow path into which the reformed gas is introduced.

In the method of exhaust cleaning, by introducing the reformed gas which has a higher temperature than that of the exhaust gas in the exhaust flow path, an increase in temperature of the catalyst in the third exhaust converter is assisted, then, the light-off time can be shortened.

According to a fourth aspect of the present invention, there is provided the method of exhaust cleaning for an internal combustion engine, where when an inlet temperature of the exhaust converter is not less than 200° C. and the reformed gas is introduced into the exhaust flow path, an oxygen concentration in the exhaust gas in the exhaust flow path is set to be not more than 0.5% in a combustion under a rich condition and during a time of introducing the reformed gas.

In the method of exhaust cleaning, when the inlet temperature of the exhaust converter is not less than 200° C. and the reformed gas is introduced in the exhaust flow path, a reaction of hydrogen production from carbon monoxide and water vapor in the exhaust gas can be promoted by setting the oxygen concentration in the exhaust gas in the exhaust flow path to be not more than 0.5%, and as a result, cleaning of the nitrogen oxides in the third exhaust converter through adsorption and reduction can be stably conducted.

According to a fifth aspect of the present invention, there is provided the method of exhaust cleaning for an internal combustion engine, where when an inlet temperature of the exhaust converter is not more than 200° C., the reformed gas is supplied to the exhaust converter in a combustion under a lean condition of the internal combustion engine.

In the method of exhaust cleaning, when the inlet temperature of the exhaust converter is not more than 200° C., by supplying the reformed gas in the exhaust converter even in a combustion under the lean condition of the internal combustion engine, the light-off time of the third exhaust converter can be shortened by the burning of carbon monoxide to be introduced.

According to a sixth aspect of the present invention, there is provided the method of exhaust cleaning for an internal combustion engine, where the step for producing a reformed gas containing carbon monoxide by reforming the fuel of the internal combustion engine is a step for producing the reformed gas by a partial oxidation reaction between hydrocarbons of the fuel of the internal combustion engine and an oxygen-containing gas.

In the method of exhaust cleaning, by producing the reformed gas by the partial oxidation reaction between the hydrocarbons of the fuel of the internal combustion engine and the oxygen-containing gas and by supplying the reformed gas in the third exhaust converter together with the exhaust gas, the nitrogen oxides in the exhaust gas can be cleaned through adsorption and reduction.

According to a seventh aspect of the present invention, there is provided the method of exhaust cleaning for an internal combustion engine, where light oil in the internal combustion engine is combusted by a compression ignition.

By applying the method of exhaust cleaning to the internal combustion engine where light oil is combusted by the compression ignition and nitrogen oxides are hardly cleaned, the exhaust gas can be efficiently cleaned.

According to an eighth aspect of the present invention, there is provided an exhaust cleaner for an internal combustion engine which combusts a fuel which is periodically fed under a rich condition and a lean condition, where a first exhaust converter provided with a catalyst which reduces nitrogen oxides by oxidizing carbon monoxide and hydrocarbons, a second exhaust converter for collecting a particulate matter and a third exhaust converter provided with a catalyst which adsorbs and reduces the nitrogen oxides are disposed in this order from an upstream side to a downstream side in an exhaust flow path of the internal combustion engine, a fuel reformer which produces a reformed gas containing carbon monoxide by reforming the fuel of the internal combustion engine is independently disposed from the exhaust flow path of the internal combustion engine, and the reformed gas is introduced into the exhaust flow path between the second exhaust converter and the third exhaust converter.

In the exhaust cleaner, by introducing the reformed gas produced by the fuel reformer which is independently disposed from the exhaust flow path into the exhaust gas flowing into the third exhaust converter, nitrogen oxides are adsorbed and reduced by the catalyst disposed in the third exhaust converter, and the exhaust gas can be cleaned, accordingly.

According to a ninth aspect of the present invention, there is provided an exhaust cleaner for an internal combustion engine, where the first exhaust converter is provided with a catalyst which contains at least one selected from platinum and palladium and at least one selected from rhodium and cerium.

In the exhaust cleaner, in the first exhaust converter, carbon monoxide and hydrocarbons in the exhaust gas discharged from the internal combustion engine are burnt by the catalyst which contains at least one selected from platinum and palladium and at least one selected from rhodium and cerium, and accordingly, an amount of the nitrogen oxides in the exhaust gas can be reduced.

According to a tenth aspect of the present invention, there is provided an exhaust cleaner for an internal combustion engine, where the third exhaust converter is provided with a shift reaction catalyst that produces hydrogen from carbon monoxide and water vapor, a catalyst that produces ammonia by reacting hydrogen with nitrogen oxides and a catalyst that adsorbs and holds the produced ammonia.

In the exhaust cleaner, by introducing the reformed gas containing carbon monoxide in the third exhaust converter together with the exhaust gas, nitrogen oxides in the exhaust gas are adsorbed and reduced by the shift reaction catalyst that produces hydrogen from carbon monoxide and water vapor, the catalyst that produces ammonia by reacting hydrogen with nitrogen oxides and the catalyst that adsorbs and holds the produced ammonia, and the exhaust gas can be cleaned, accordingly.

According to an eleventh aspect of the present invention, there is provided an exhaust cleaner for an internal combustion engine, where the third exhaust converter is provided with a catalyst containing platinum and ceria, and zeolite.

In the exhaust cleaner, by introducing the reformed gas containing carbon monoxide into the third converter together with the exhaust gas, nitrogen oxides in the exhaust gas are adsorbed and reduced by the catalyst containing platinum and ceria, and zeolite, and the exhaust gas can be cleaned, accordingly.

According to a twelfth aspect of the present invention, there is provided an exhaust cleaner for an internal combustion engine, where the fuel reformer produces the reformed gas by a partial oxidation reaction between hydrocarbons of the fuel of the internal combustion engine and an oxygen-containing gas.

In the exhaust cleaner, in the reformer, the reformed gas is produced by the partial oxidation reaction between hydrocarbons of the fuel of the internal combustion engine and the oxygen-containing gas, and by introducing the reformed gas into the third exhaust converter together with the exhaust gas, nitrogen oxides in the exhaust gas are adsorbed and reduced, and accordingly, the exhaust gas can be cleaned.

According to a thirteenth aspect of the present invention, there is provided an exhaust cleaner for an internal combustion engine, where the internal combustion engine combusts light oil by a compression ignition.

Since nitrogen oxides are hardly cleaned in an internal combustion engine which combusts light oil by the compression ignition due to a low temperature of the exhaust gas, the exhaust gas is efficiently cleaned by applying the exhaust cleaner to the internal combustion engine.

EFFECTS OF THE INVENTION

According to the method of exhaust cleaning for internal combustion engine and the exhaust cleaner of the present invention, nitrogen oxides contained in an exhaust gas of an internal combustion engine can be cleaned at a high efficiency. Especially, by producing a reformed gas containing carbon monoxide by using the fuel reformer which is independently disposed from the exhaust flow path and by supplying the reformed gas to a catalyst which adsorbs and reduces nitrogen oxides in the exhaust gas of the internal combustion engine under a periodical rich condition and lean condition, a performance of the catalyst can be increased. As a result, the nitrogen oxides in the exhaust gas can be cleaned at a high efficiency.

In addition, in the exhaust cleaner for internal combustion engine according to the present invention, by producing a reformed gas by the fuel reformer which is independently disposed from the exhaust flow path and by supplying the reformed gas to the third exhaust converter, a fuel consumption can be suppressed, as well as the exhaust cleaner can be made small in size and the cost can be reduced. In addition, an early activation of the exhaust cleaner can be started and a necessary amount of reductant can be supplied at any time according to a requirement. As a result, the exhaust gas can be cleaned efficiently.

Figure 1:
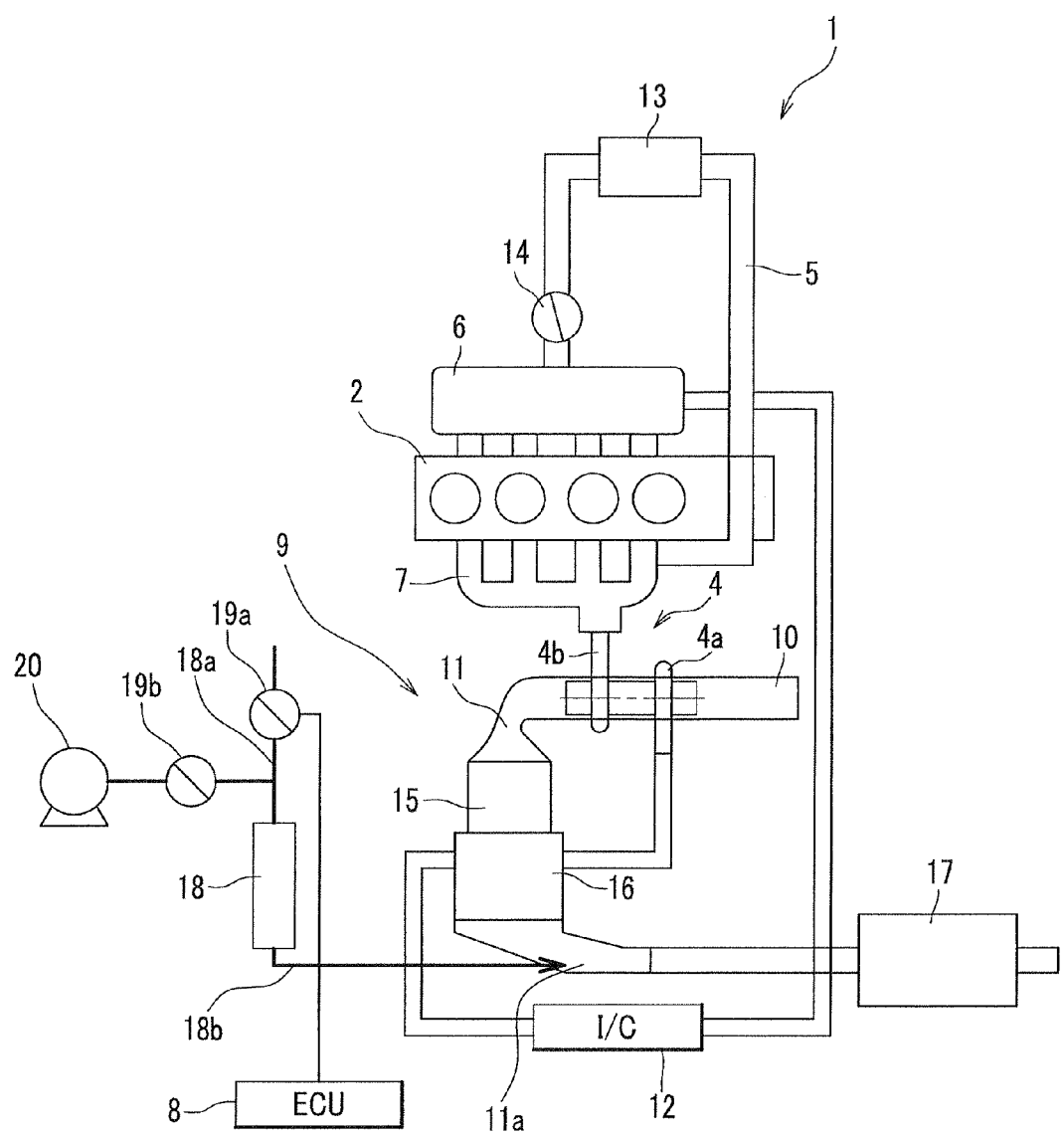
FIG. 1 is a schematic illustration showing a basic configuration of an internal combustion engine which is provided with an exhaust cleaner according to the present invention.

| DESCRIPTION OF REFERENCE CHARACTERS | |
|---|---|
| 1 | Internal combustion engine |
| 2 | Cylinder head |
| 4 | Turbocharger |
| 4a | Compressor |
| 4b | Turbine |
| 5 | EGR (exhaust gas recirculation flow path) |
| 6 | Intake manifold |
| 7 | Exhaust manifold |
| 8 | ECU |
| 9 | Exhaust cleaner |
| 10 | Intake flow path |
| 11 | Exhaust flow path |
| 12 | Intercooler |
| 13 | EGR cooler |
| 14 | EGR valve |
| 15 | First exhaust converter |
| 16 | Second exhaust converter |
| 17 | Third exhaust converter |
| 18 | Fuel reformer |
| 18a | Fuel feeding path |
| 18b | Reformed gas flow path |
| 19a | Fuel feeding valve |
| 19b | Pressure regulating valve |
| 20 | Compressor |

DETAILED DESCRIPTION OF THE PREFERRED EMBODIMENT

Hereinafter, a method of exhaust cleaning for an internal combustion engine and an exhaust cleaner according to the present invention will be explained in detail.

FIG. 1 is a schematic illustration showing a basic configuration of an internal combustion engine which is provided with an exhaust cleaner according to the present invention.

The internal combustion engine 1 shown in FIG. 1 has a basic configuration of a diesel engine.

The internal combustion engine 1 includes a cylinder head 2 provided with four combustion chambers, a turbocharger 4, an exhaust gas recirculation flow path (hereinafter, referred to as "EGR") 5, an intake manifold 6, an exhaust manifold 7, an ECU (electronic control unit) 8 and an exhaust cleaner 9.

The cylinder head 2 is connected to a common rail (not shown) which stores a fuel for combustion to be fed to each combustion chamber at a high pressure as well as connected to the intake manifold 6, and is provided with a fuel injection valve (not shown) whose front end extends to the combustion chamber. In addition, a fuel pump (not shown) for feeding a fuel by pumping up the fuel from a fuel tank (not shown) is connected to the common rail.

In the turbocharger 4, an intake flow path 10 is connected to a side of a compressor 4a and an exhaust flow path 11 is connected to a side of a turbine 4b. In addition, the downstream side of the intake flow path 10 is connected to an intake manifold 6 through an intercooler 12. On the upstream side of the intake flow path 10, for example, an air cleaner for cleaning intake air, an intake control valve for controlling an amount of the intake air, and a swirl control valve which increases an intake air velocity at a low revolution speed and under a light load operation by throttling a cross sectional area of the flow path are disposed.

The EGR 5 is connected to the exhaust manifold 7 which is connected to an exhaust port of each chamber of the cylinder head 2 and is connected to the intake manifold 6 through an EGR cooler 13 and an EGR valve 14. The EGR cooler 13 cools an exhaust gas which is recirculated to the intake manifold 6 from the exhaust manifold 7 to flow into the combustion chamber, and the EGR valve 14 controls an amount of the recirculation of the exhaust gas flowing into the combustion chamber.

The ECU 8 controls operations of, for example, the turbocharger 4, an intake control valve disposed in the intake flow path 10, an EGR control valve, a fuel injection valve disposed in each combustion chamber of the cylinder head 2 and a fuel pump. Output signals from, for example, an intake valve gate opening sensor arranged at a predetermined position of the internal combustion engine 1, a crankshaft revolution speed sensor, an intake flow rate sensor, a boost pressure sensor, an EGR valve gate opening sensor, a common rail pressure sensor, an accelerator pedal depression amount sensor, temperature sensors disposed in various parts of the exhaust cleaner 9 and a combustion pressure sensor are input to the ECU 8. A map where control target values of various control targets, such as an optimum fuel injection amount corresponding to a crankshaft revolution speed and a required torque (accelerator pedal depression amount) which are acquired in advance by, for example, experiments, are set is stored in a memory of the ECU 8, and a control for each control target is conducted so that an optimum combustion condition corresponding to a loading status of the internal combustion engine 1 can be obtained.

The exhaust cleaner 9 includes a first exhaust converter 15, a second exhaust converter 16 and a third exhaust converter 17 in this order from the upstream side to the downstream side in an exhaust flow path 11, and further includes a fuel reformer 18.

The first exhaust converter 15 is provided with a catalyst which reduces nitrogen oxides by oxidizing carbon monoxide and hydrocarbons in the exhaust gas. As a catalyst to be used, a catalyst which contains at least one selected from platinum and palladium and at least one selected from rhodium and cerium may be used. Rhodium is an essential catalytic component for assisting absorption and reduction performances of nitrogen oxides in the third exhaust converter 17, and cerium has a high performance for absorption and emission of oxygen and is an essential catalytic component for stably performing catalysis even when an oxygen concentration varies rapidly.

The second exhaust converter 16 is provided with a catalyst or a filter for collecting a particulate matter, for example, soot in the exhaust gas. As a filter material for collecting the particulate matter, for example, silicon carbide (SiC) and cordierite may be used. In addition, silicon carbide (SiC) and cordierite which support an oxidation catalyst containing platinum or palladium may be used.

The upstream side of fuel reformer 18 is connected to a fuel tank (not shown) of the internal combustion engine 1 by a fuel feeding path 18a through a fuel feeding valve 19a. The fuel feeding path 18a is connected to a compressor 20 through a pressure regulation valve 19b. In addition, the downstream side of the fuel reformer 18 is connected to an exhaust flow path 11a which connects the second exhaust converter 16 and the third exhaust converter 17 by a reformed gas flow path 18b.

In the fuel reformer 18, a fuel fed from the fuel tank (not shown) of the internal combustion engine 1 by the fuel feeding path 18a through the fuel feeding valve 19a is reformed to produce a reformed gas containing carbon monoxide. The produced reformed gas is introduced into the exhaust gas flowing in the exhaust flow path 11a which is connected to the reformed gas flow path 18b through the reformed gas flow path 18b. The temperature sensors (not shown) set in the fuel feeding valve 19a, the pressure regulating valve 19b, the compressor 20 and the fuel reformer 18 are connected to the ECU 8 and operate in conjunction with the internal combustion engine 1.

A reforming of the fuel in the fuel reformer 18 is conducted by a partial oxidation reaction of hydrocarbons composing the fuel. The partial oxidation reaction of the hydrocarbons is a reaction expressed by the following Formula 9 if, for example, light oil is used as the hydrocarbons.

$$C_nH_{1.8}n + 0.5nO_2 \rightarrow nCO + 0.9nH_2 \quad \text{Formula 9:}$$

The partial oxidation reaction proceeds at a high temperature, especially, hydrogen is highly combustible at a high temperature and a selection efficiency of carbon monoxide increases.

As a catalyst used for the fuel reformer 18, for example, a catalyst containing rhodium and cerium and a catalyst containing rhodium, platinum and alumina may be used.

The third exhaust converter 17 is provided with a catalyst (hereinafter, referred to as "NOx adsorption/reduction catalyst") which adsorbs and reduces nitrogen oxides, and cleans the exhaust gas using the NOx adsorption/reduction catalyst by adsorbing and reducing nitrogen oxides in the exhaust gas introduced from the exhaust flow path 11a together with the reformed gas.

The adsorption/reduction of nitrogen oxides in the third exhaust converter 17 is conducted by repeating the following Process A (A1, A2) and Process B. Namely, the following Process A (A1, A2) and Process B are repeated depending on a lean state and a rich state of the exhaust gas discharged from the internal combustion engine 1 where a fuel is periodically fed by a lean condition and a rich condition to be combusted. In the lean state where an air fuel ratio in the exhaust gas is high, nitrogen oxides NOx (NO, $NO_2$) in the exhaust gas adsorb on the catalyst and nitrogen monoxide (NO) is oxidized (Process A1), while in the rich state where the air fuel ratio in the exhaust gas is low, ammonia ($NH_3$) is produced (Process B) on the catalyst from nitrogen dioxides ($NO_2$). When the state becomes the next lean state where the air fuel ratio in the exhaust gas is high, nitrogen oxides NOx is reduced by a reaction between the nitrogen oxides NOx in the exhaust gas and ammonia ($NH_3$) adsorbed on the catalyst to produce (Process A2) nitrogen ($N_2$) and water ($H_2O$), thereby resulting in cleaning of the nitrogen oxides NOx in the exhaust gas.

Process A1

$NO, NO_2 \rightarrow NOx(ad)$ lean state $NO(ad) \rightarrow NO_2(ad)$ lean state Process B $NO_2(ad) \rightarrow NH_3(ad)$ rich state Process A2

$NH_3(ad) + NOx \rightarrow N_2, H_2O$ lean state

Figure 2:
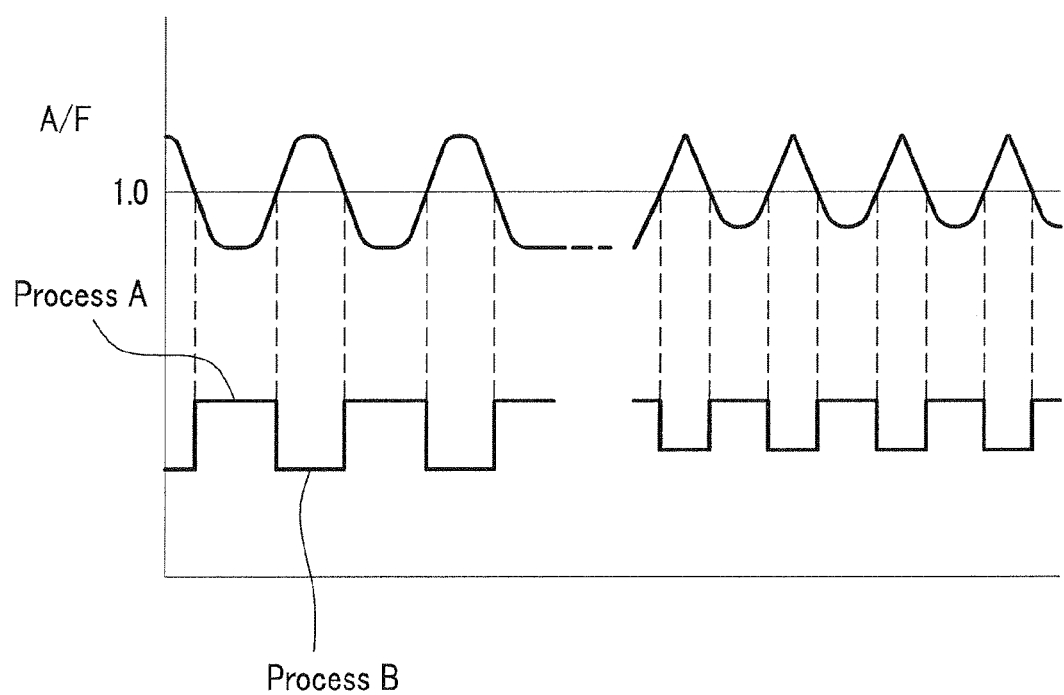
FIG. 2 is an illustration for explaining an air fuel ratio in an exhaust gas of an internal combustion engine and operations of adsorption/reduction catalyst.

An air fuel ratio in an exhaust gas of an internal combustion engine and operations of an adsorption/reduction catalyst in the Process A (A1, A2) and Process B are shown in FIG. 2.

In this case, the NOx adsorption/reduction catalyst contains a shift reaction catalyst that produces hydrogen from carbon monoxide and water vapor, a catalyst that produces ammonia by reacting hydrogen with nitrogen oxides and a catalyst that adsorbs and holds the produced ammonia. The shift reaction catalyst produces hydrogen which is necessary for producing ammonia ($NH_3$) from nitrogen dioxide ($NO_2$) in the Process B. Namely, the shift reaction catalyst has a role to produce hydrogen by the following shift reaction.

$CO + H_2O \rightarrow H_2 + CO_2$

As a NOx adsorption/reduction catalyst, especially, a catalyst containing platinum and ceria, and zeolite may be used. Platinum and ceria (cerium oxide) hardly cause methanation and promote a shift reaction, and existences of platinum and ceria are essential for effectively conducting hydrogen production from carbon monoxide and water vapor and ammonia synthesis from hydrogen and nitrogen monoxide. As a material for holding the produced ammonia, zeolite is the most effective.

In the adsorption/reduction of nitrogen oxides by the NOx adsorption/reduction catalyst, a reformed gas supplied from the fuel reformer 18 contains carbon monoxide, and the carbon monoxide is supplied to the shift reaction by the shift reaction catalyst which is provided in the third exhaust converter 17.

Meanwhile, in the internal combustion engine 1 provided with the exhaust cleaner 9, an air flowing in the intake flow path 10 is suctioned into a combustion chamber through the intake manifold 6 when an intake valve (not shown) of the combustion chamber of the cylinder head 2 is opened and a piston (not shown) moves down. The suctioned air is compressed to be a high temperature when the piston moves up.

On the other hand, a fuel (light oil) stored in a fuel tank (not shown) is supplied to a fuel injection valve through a fuel pump and a common rail (not shown), injected into a combustion chamber when the fuel injection valve is driven, and spontaneously ignited (compression ignition) to combust by the suctioned air which is at a high temperature due to the compression. After the piston is driven downward by the combustion pressure, when the piston moves up again, an exhaust valve (not shown) opens and the exhaust gas is discharged to the exhaust manifold 7. The discharged exhaust gas flows into the exhaust flow path 11.

Then, the EGR valve 14 is activated according to a control signal from the ECU 8, and a part of the exhaust gas is recirculated to the intake manifold 6 through the EGR 5 which is connected to the exhaust manifold 7.

In addition, in the turbocharger 4 disposed in the exhaust flow path 11, the turbine 4b is rotated by the exhaust gas, and the compressor 4a which is mechanically connected to the turbine 4b is driven by the rotation, and as a result, the air which is suctioned from the intake flow path 10 is boosted. The boosted air by the turbocharger 4 is supplied to the intake manifold 6 after the air is cooled in the intercooler 12.

The exhaust gas discharged to the exhaust manifold 7 flows into the first exhaust converter 15, the second exhaust converter 16 and the third exhaust converter 17 of the exhaust cleaner 9 in this order through the exhaust flow path 11. In the first exhaust converter 15, carbon monoxide and hydrocarbons (HC) are burnt to reduce nitrogen oxides, in the second exhaust converter 16, a particulate matter is collected and in the third exhaust converter 17, the nitrogen oxides are adsorbed and reduced to be cleaned.

Here, in the internal combustion engine 1, as described above, the injected fuel into the combustion chamber is self-ignited and combusted by contacting with the suctioned air at a high temperature due to the compression, and the piston is driven downward. In addition, the exhaust gas produced by the combustion is discharged to the exhaust manifold 7 and the exhaust flow path 11 when an exhaust valve (not shown) is opened in the exhaust stroke. The combustion by the self ignition of the internal combustion engine 1 is conducted under a lean condition where the air fuel ratio (A/F) is higher than the theoretical air fuel ratio. Therefore, the exhaust gas discharged from the internal combustion engine 1 has a high air fuel ratio (A/F). On the other hand, in the internal combustion engine 1, after the forgoing normal fuel injection was conducted and combustion took place under a lean condition, and when the internal combustion engine 1 is under a light to a middle load at around the exhaust stroke moved from the combustion and expansion stroke, a post-injection that injects a fuel based on a post-injection amount is conducted through the fuel injection valve. Since a compressed air does not exist in the post-injection, most of the injected fuel is discharged in an exhaust line as an unburnt fuel without being combusted. Most of components of the unburnt fuel are HC (hydrocarbons). Therefore, the exhaust gas at this time is under the rich condition where the air fuel ratio (A/F) is lower than the theoretical air fuel ratio. In addition, by controlling the air fuel ratio of the internal combustion engine 1, the rich condition may be created depending on an operating condition (combustion rich). Therefore, the rich condition may be created by combining the two methods described above.

As described above, in the internal combustion engine 1, combustions under a lean condition and a rich condition are periodically conducted, and as shown in FIG. 2, an exhaust gas discharged from the internal combustion engine 1 periodically repeats a lean state where the air fuel ratio (A/F) is higher than a theoretical air fuel ratio and a rich state where the air fuel ratio (A/F) is lower than the theoretical air fuel ratio.

The exhaust gas discharged from the internal combustion engine 1 is cleaned as follows in the first exhaust converter 15, the second exhaust converter 16 and the third exhaust converter 17 depending on a periodical lean state and rich state in the exhaust gas.

Next, a method of exhaust cleaning in the exhaust cleaner 9 will be explained.

First, since an exhaust gas of a rich state which is generated by the post-injection and the fuel rich state of the internal combustion engine 1 has a low air fuel ratio, the exhaust gas includes carbon monoxide and unburnt hydrocarbons. In the first converter 15, nitrogen oxides NOx are reduced by oxidation of the unburnt hydrocarbons and the carbon monoxide.

Next, in the second exhaust converter 16, a particulate matter (PM) contained in the exhaust gas is collected by a filter and the collected particulate matter is gradually piled up. The piled up particulate matter is burnt by an oxidation catalyst supported on the filter. In this case, in the exhaust gas of the rich state due to the post-injection, since a temperature of the exhaust gas is raised by the oxidation of the hydrocarbons and the carbon monoxide in the first exhaust converter 15, the particulate matter is burnt by the oxidation catalyst due to the raised temperature.

Next, a reformed gas supplied from the fuel reformer 18 through the reformed gas flow path 18b is introduced into the exhaust gas from which the particulate matter is removed in the second exhaust converter 16 in the exhaust flow path 11a. The exhaust gas into which the reformed gas is introduced is introduced into the third exhaust converter 17, and as described above, nitrogen oxides are adsorbed and reduced to be cleaned depending on a lean state and a rich state of the exhaust gas. The cleaned exhaust gas is discharged outside.

In the exhaust cleaner 9, a heat absorption amount in the second exhaust converter 16 is large. Therefore, by introducing a reformed gas whose temperature is higher than a temperature of the exhaust gas in the exhaust flow path 11a, an increase in temperature of the catalyst in the third exhaust converter 17 can be assisted, and a light-off time of the third exhaust converter 17 can be shortened, accordingly.

In addition, by introducing a reformed gas at a high temperature into the third exhaust converter 17, thereby burning a part of carbon monoxide which is introduced, the light-off time of the third exhaust converter 17 can be shortened, even if a temperature of the catalyst in the third exhaust converter 17 is low (at around RT to 50° C.), for example, at a starting of an internal combustion engine and under a lean condition. Namely, if the temperature of the catalyst in the third exhaust converter 17 increases, ammonia is produced from hydrogen produced by the shift reaction or from hydrogen contained in the reformed gas, and nitrogen oxides are cleaned, accordingly. Then, a time until starting cleaning of nitrogen oxides by activating the third exhaust converter 17 (hereinafter, referred to as "light-off time") can be shortened.

In addition, since the shift reaction and the ammonia production reaction are not caused under the condition that a temperature of the exhaust gas flowing in the exhaust flow path 11a is sufficiently high (more than 200° C.) as well as in an oxygen excessive atmosphere, it is preferable to control an oxygen concentration in the exhaust flow path 11a within 0.5%. The oxygen concentration in the exhaust flow path 11a is monitored by oxygen sensors disposed in the exhaust flow path 11a and at a position after the third exhaust converter 17, and the oxygen concentration can be controlled by controlling, for example, a fuel feeding amount, a fuel injection timing, an air supply amount, an EGR amount and a boost pressure by the ECU 8.

The exhaust cleaner 9 of the internal combustion engine 1 has the following advantages by disposing the fuel reformer 18 to be independent from the exhaust flow path 11.

(1) In the third exhaust converter 17, the shift reaction in the exhaust gas of a rich state is effectively promoted to produce hydrogen. In the reaction, in order to increase a hydrogen concentration to be produced, a proper converter volume is required due to a slow reaction speed of the shift reaction. Therefore, by producing a reformed gas which is rich in carbon monoxide in the fuel reformer 18 and by using the reformed gas, a partial pressure of carbon monoxide can be increased, and as a result, the third exhaust converter 17 can be made small in size.

(2) By disposing the fuel reformer 18 to be independent from the exhaust flow path 11, a reaction for producing a synthesized gas can be effectively conducted regardless of, for example, components of the exhaust gas, a temperature of the exhaust gas and a velocity of the exhaust gas. As a result, an amount of catalyst can be reduced, thereby resulting in low cost. In addition, fuel consumption can be reduced, while increasing a life of the catalyst.

(3) The fuel reformer 18 can be made small in size with a small heat loss. In addition, by disposing the fuel reformer 18 to be independent, early activation of the fuel reformer 18 can be achieved by a control independent from the control of the internal combustion engine 1, and a supply of carbon monoxide becomes possible before a temperature of the exhaust gas from the internal combustion engine 1 increases. As a result, when carbon monoxide is produced by a control of the internal combustion engine 1, a concentration of hydrocarbons, which are secondarily produced, especially, at a low temperature, in the exhaust gas can be suppressed.

(4) In a method for producing carbon monoxide by a combustion control of the internal combustion engine 1, there is a problem to generate noises and vibrations caused by a complexity of the control. However, by producing carbon monoxide by the fuel reformer 18 which is independently disposed from the exhaust flow path 11, a control of the internal combustion engine 1 can be simplified, and the generation of the noises and the vibrations can be suppressed.

(5) Since, for example, a converter or a system for condensing hydrogen, for example, by the shift reaction, is not required within the fuel reformer 18 and the exhaust flow path 11, the exhaust system can be made small in size and simple.

(6) By producing a reformed gas containing carbon monoxide by reforming a fuel in the fuel reformer 18 which is independently disposed from the exhaust flow path 11, the reformed gas can be effectively produced regardless of, for example, fluctuations of an oxygen concentration and a water vapor concentration in the exhaust gas.

(7) By producing a reformed gas in the fuel reformer 18 which is independently disposed from the exhaust flow path 11, the reformed gas can be stably produced by increasing selection efficiency of carbon monoxide in the reforming reaction of the fuel reformer 18. Therefore, it becomes possible to introduce much carbon monoxide in the third exhaust converter 17, to promote hydrogen production by the shift reaction, and to increase a synthesis amount and a holding amount of ammonia. Accordingly, nitrogen oxides can be effectively cleaned.

(8) By introducing a reformed gas into the exhaust gas in the exhaust flow path 11a between the downstream of the second exhaust converter 16 and the upstream of the third exhaust converter 17, a discharge pressure of the reformed gas to an exhaust flow path can be made low. Therefore, in the fuel reformer 18, equipment such as an air compressor which consumes large energy is not required and, in addition, a high efficiency reaction at low pressure that is advantageous in view of reaction equilibrium because the production reaction of the reformed gas increases a number of moles can be conducted.

Example

The present invention will be specifically explained below using an example of the present invention and a comparative example. However, the present invention is not limited to the following example.

Example

In the exhaust cleaner 9 of the internal combustion engine 1 shown in FIG. 1, as a reforming catalyst to be used for the fuel reformer 18, a reforming catalyst composed of 1% rhodium (Rh)/cerium oxide ($CeO_2$) was used, and a catalyst (TWC catalyst) to be used for the first exhaust converter 15 and a NOx adsorption/reduction catalyst (LNC catalyst) to be used for the third exhaust converter 17 were also prepared.

Method for Preparing TWC Catalyst and LNC Catalyst

Materials of components of each catalyst were put in a ball mill together with an aqueous medium so as to have a composition shown in the following TABLE 1 and TABLE 2, and agitated and mixed to prepare slurry. The obtained slurry was coated on a cordierite, and dried and baked at 600° C. for 2 hours to prepare a TWC catalyst and an LNC catalyst shown in the TABLE 1 and TABLE 2, respectively.

TABLE 1

Composition of TWC catalyst

| Composition | [g/L] |
| --- | --- |
| Pt | 2.4 |
| Rh | 1.2 |
| Pd | 6.0 |
| Binder | 10 |

TABLE 2

Composition of LNC catalyst

| Composition | [g/L] |
| --- | --- |
| Pt | Under layer 4.5 |
| Rh | — |
| Pd | — |
| $CeO_2$ | Under layer 60 |
| Fe, Ce ion exchange β zeolite | Upper layer 75 |
| $Al_2O_3$ | Upper layer 7 |
|  | Under layer 30 |
| Binder | Upper layer 8 |
| Ce—Pr—La—Ox | Under layer 60 |
| Zr—Ox | Under layer 20 |

Using the reforming catalyst, the TWC catalyst and the LNC catalyst, a catalytic layer is disposed in the fuel reformer 18, in the first exhaust converter 15 and in the third exhaust converter 17 to configure an exhaust cleaner which has the following specifications.

Internal combustion engine
  Displacement: 2.2 L
First exhaust converter
  Capacity: 0.8 L
  Amount of TWC catalyst: 150 g/L
Second exhaust converter (DPF)
  Capacity: 2.5 L (no catalyst)
Third exhaust converter
  Capacity: 2 L
  Amount of LNC catalyst: 250 g/L
Fuel reformer:
  Dimension: φ80 mm×L60 mm (catalyst converter capacity: 30 $cm^3$)

Exhaust cleaning efficiency was measured by a bench test of an internal combustion engine. The cleaning efficiency of nitrogen oxides in the exhaust gas discharged from the third exhaust converter was not less than 95% in the operation where the exhaust gas temperature is 150° C., then, it was demonstrated that the method of exhaust cleaning and the exhaust cleaner of the present invention were effective for cleaning the nitrogen oxides.

What is claimed is:

1. A method of exhaust cleaning for an internal combustion engine which combusts a fuel which is periodically fed under a rich condition and a lean condition, the method comprising:
   a step for producing a reformed gas containing carbon monoxide by reforming the fuel of the internal combustion engine by a fuel reformer which is independently disposed from an exhaust flow path of the internal combustion engine;
   a step for adsorbing and reducing nitrogen oxides in an exhaust gas by supplying the reformed gas to the exhaust gas introduced into an exhaust converter which is disposed in the exhaust flow path and in which a catalyst for absorbing and reducing the nitrogen oxides is disposed;
   a step for setting an oxygen concentration in the exhaust gas in the exhaust flow part to be not more than 0.5% in a combustion under a rich condition and during a time of introducing the reformed gas; and
   a step for setting a temperature of the reformed gas introduced into the exhaust flow path to be higher than a temperature of the exhaust gas in the exhaust flow path into which the reformed gas is introduced, wherein the reformed gas is introduced into the exhaust flow path while an inlet temperature of the exhaust converter is not less than 200° C.

2. The method of exhaust cleaning for an internal combustion engine according to claim 1, further comprising:
   a step for containing more carbon monoxide than hydrogen in the reformed gas.

3. The method of exhaust cleaning for an internal combustion engine according to claim 1,
   wherein the step for producing a reformed gas containing carbon monoxide by reforming the fuel of the internal combustion engine is a step for producing the reformed gas by a partial oxidation reaction between hydrocarbons of the fuel of the internal combustion engine and an oxygen-containing gas.

4. The method of exhaust cleaning for an internal combustion engine according to claim 1, further comprising:
   a step for combusting light oil in the internal combustion engine by a compression ignition.

5. The method of exhaust cleaning for an internal combustion engine according to claim 3, further comprising:
   a step for combusting light oil in the internal combustion engine by a compression ignition.

6. An exhaust cleaner for an internal combustion engine which combusts a fuel which is periodically fed under a rich condition and a lean condition,
   wherein a first exhaust converter provided with a catalyst which reduces nitrogen oxides by oxidizing carbon monoxide and hydrocarbons, a second exhaust converter for collecting a particulate matter and a third exhaust converter provided with a catalyst which adsorbs and reduces the nitrogen oxides are disposed in this order from an upstream side to a downstream side in an exhaust flow path of the internal combustion engine;
   wherein a fuel reformer which produces a reformed gas containing carbon monoxide by reforming the fuel of the internal combustion engine is independently disposed from the exhaust flow path of the internal combustion engine; and
   wherein the reformed gas introduced into the exhaust flow path between the second exhaust converter and the third exhaust converter has a temperature that is higher than a temperature of an exhaust gas in the exhaust flow path, and
   wherein the reformed gas is introduced into the exhaust flow path while an inlet temperature of the exhaust converter is not less than 200° C. and an oxygen concentration in the exhaust gas in the exhaust flow path is not more than 0.5% under a rich condition and during a time of introducing the reformed gas.

7. The exhaust cleaner for an internal combustion engine according to claim 6,
   wherein the first exhaust converter is provided with a catalyst which contains at least one selected from platinum and palladium and at least one selected from rhodium and cerium.

8. The exhaust cleaner for an internal combustion engine according to claim 6,
   wherein the third exhaust converter is provided with a shift reaction catalyst that produces hydrogen from carbon monoxide and water vapor, a catalyst that produces ammonia by reacting hydrogen with nitrogen oxides and a catalyst that adsorbs and holds the produced ammonia.

9. The exhaust cleaner for an internal combustion engine according to claim 7,
   wherein the third exhaust converter is provided with a shift reaction catalyst that produces hydrogen from carbon monoxide and water vapor, a catalyst that produces ammonia by reacting hydrogen with nitrogen oxides and a catalyst that adsorbs and holds the produced ammonia.

10. The exhaust cleaner for an internal combustion engine according to claim 6,
    wherein the third exhaust converter is provided with a catalyst containing platinum and ceria, and zeolite.

11. The exhaust cleaner for an internal combustion engine according to claim 6,
    wherein the fuel reformer produces the reformed gas by a partial oxidation reaction between hydrocarbons of the fuel of the internal combustion engine and an oxygen-containing gas.

12. The exhaust cleaner for an internal combustion engine according to claim 10,
    wherein the fuel reformer produces the reformed gas by a partial oxidation reaction between hydrocarbons of the fuel of the internal combustion engine and an oxygen-containing gas.

13. The exhaust cleaner for an internal combustion engine according to claim 6,
    wherein the internal combustion engine combusts light oil by a compression ignition.

14. The exhaust cleaner for an internal combustion engine according to claim 10,
    wherein the internal combustion engine combusts light oil by a compression ignition.

15. The exhaust cleaner for an internal combustion engine according to claim 11,
    wherein the internal combustion engine combusts light oil by a compression ignition.

16. The exhaust cleaner for an internal combustion engine according to claim 12,
    wherein the internal combustion engine combusts light oil by a compression ignition.

* * * * *